US012592020B2

(12) United States Patent
Yu et al.

(10) Patent No.: US 12,592,020 B2
(45) Date of Patent: Mar. 31, 2026

(54) TRACKING SYSTEM, TRACKING METHOD, AND SELF-TRACKING TRACKER

(71) Applicant: HTC Corporation, Taoyuan City (TW)

(72) Inventors: Tzu-Chieh Yu, Taoyuan City (TW); Chun-Kai Huang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 334 days.

(21) Appl. No.: 18/447,234

(22) Filed: Aug. 9, 2023

(65) Prior Publication Data

US 2024/0104820 A1     Mar. 28, 2024

Related U.S. Application Data

(60) Provisional application No. 63/408,861, filed on Sep. 22, 2022.

(51) Int. Cl.
| | |
|---|---|
| *G06T 13/40* | (2011.01) |
| *G01P 3/00* | (2006.01) |
| *G01P 15/18* | (2013.01) |
| *G02B 27/01* | (2006.01) |
| *G06F 3/01* | (2006.01) |
| *G06T 7/70* | (2017.01) |

(52) U.S. Cl.
CPC .............. *G06T 13/40* (2013.01); *G01P 3/00* (2013.01); *G01P 15/18* (2013.01); *G02B 27/017* (2013.01); *G06F 3/011* (2013.01); *G06F 3/012* (2013.01); *G06F 3/013* (2013.01); *G06T 7/70* (2017.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 11,507,203 | B1 * | 11/2022 | Bosworth | .............. G06V 10/82 |
| 2016/0171770 | A1 * | 6/2016 | Pedrotti | .................. G06F 3/012 |
| | | | | 345/633 |
| 2019/0243472 | A1 * | 8/2019 | Stafford | .............. G02B 27/017 |
| 2021/0042513 | A1 * | 2/2021 | Kato | ....................... G06F 3/011 |

FOREIGN PATENT DOCUMENTS

| | | |
|---|---|---|
| TW | 202201178 | 1/2022 |
| TW | 202217661 | 5/2022 |

OTHER PUBLICATIONS

"Office Action of Taiwan Counterpart Application", issued on May 8, 2024, p. 1-p. 7.

* cited by examiner

*Primary Examiner* — Jwalant Amin
(74) *Attorney, Agent, or Firm* — JCIPRNET

(57) ABSTRACT

A tracking system is provided. A head-mounted display device is adapted to be worn on a head of a user and includes: a display displays a virtual world, a first camera obtains a first image, a first processor generates a first tracking result of the user based on the first image, and a first network module. A self-tracking tracker includes: a tracking sensor detects sensor data, a second camera obtains a second image, a second processor generates a self-tracking result based on the sensor data generates a second tracking result based on the second image and the self-tracking result, and a second network module provides the second tracking result to the first network module. The first processor is further configured to update an avatar of the user in the virtual world based on the first tracking result and the second tracking result.

19 Claims, 12 Drawing Sheets

600

100A

Self-Tracking Tracker 120

Tracking Sensor 122

Second Camera 124

Second Processor 126

Second Network Module 128

Head-Mounted Display Device 110

Display 112

First Camera 114

First Processor 116

First Network Module 118

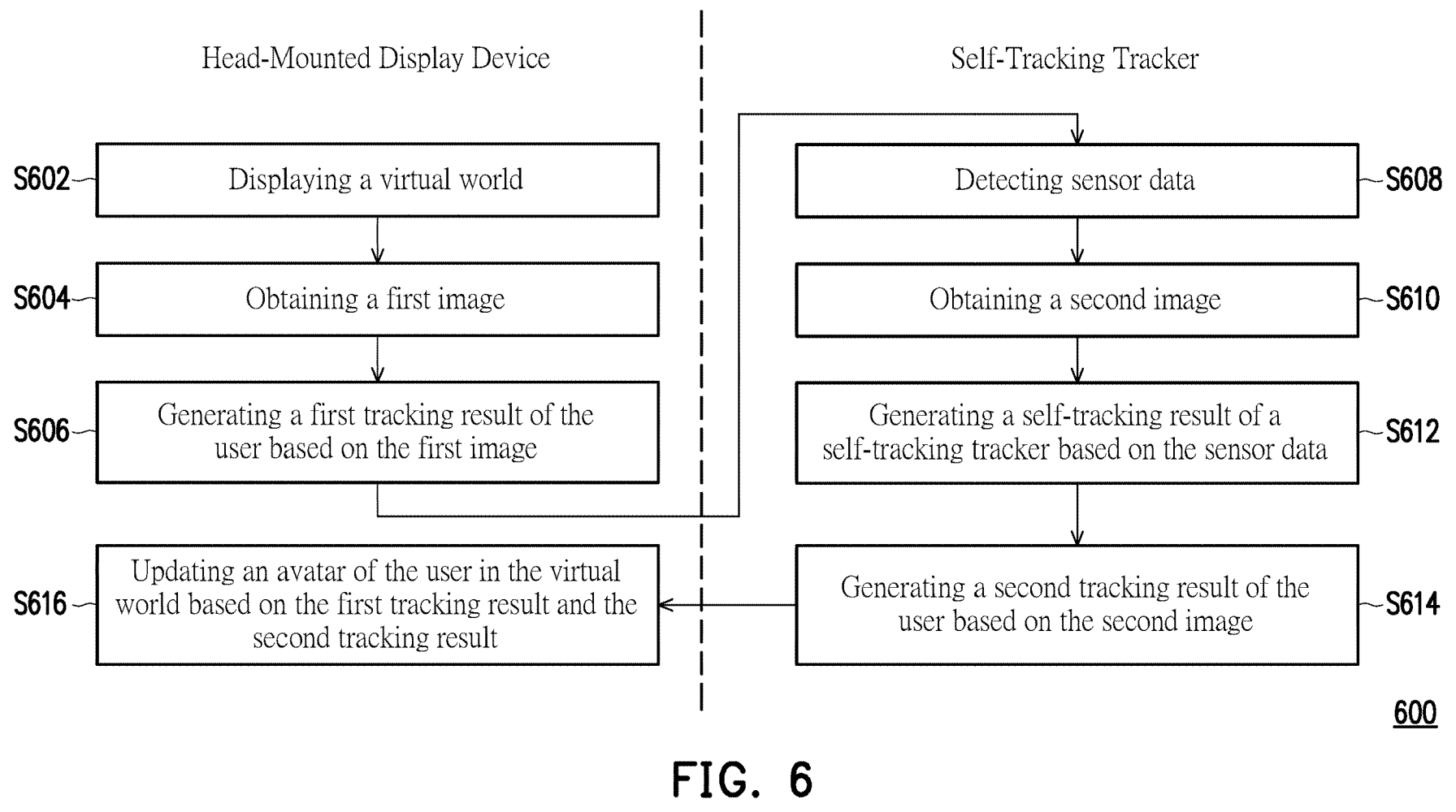

Self-Tracking Tracker

S608 Detecting sensor data

S610 Obtaining a second image

S612 Generating a self-tracking result of a self-tracking tracker based on the sensor data S614 Generating a second tracking result of the user based on the second image

600

Head-Mounted Display Device

S602 Displaying a virtual world

S604 Obtaining a first image

S606 Generating a first tracking result of the user based on the first image

S616 Updating an avatar of the user in the virtual world based on the first tracking result and the second tracking result

FIG. 6

TRACKING SYSTEM, TRACKING METHOD, AND SELF-TRACKING TRACKER

CROSS-REFERENCE TO RELATED APPLICATION

This application claims the priority benefit of U.S. provisional application Ser. No. 63/408,861, filed on Sep. 22, 2022. The entirety of the above-mentioned patent application is hereby incorporated by reference herein and made a part of this specification.

BACKGROUND

Technical Field

The disclosure relates to a tracking system; particularly, the disclosure relates to a tracking system, a tracking method, and a self-tracking tracker.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a tracking system, a tracking method, and a self-tracking tracker, so as to improve quality of tracking of a user.

In this disclosure, a tracking system is provided. The tracking system includes a head-mounted display (HMD) device and a self-tracking tracker. The head-mounted display (HMD) device is adapted to be worn on a head of a user and includes: a display, configured to display a virtual world; a first camera, configured to obtain a first image; a first processor, configured to generate a first tracking result of the user based on the first image; and a first network module. The self-tracking tracker includes: a tracking sensor, configured to detect sensor data; a second camera, configured to obtain a second image; a second processor, configured to: generate a self-tracking result based on the sensor data; and generate a second tracking result based on the second image and the self-tracking result; and a second network module, configured to provide the second tracking result to the first network module. The first processor is further configured to update an avatar of the user in the virtual world based on the first tracking result and the second tracking result.

In this disclosure, a tracking method is provided. The tracking method includes step of: displaying, by a display of a head-mounted display (HMD) device, a virtual world; obtaining, by a first camera of the HMD device, a first image; generating, by a first processor of the HMD device, a first tracking result of the user based on the first image; detecting, by a tracking sensor of a self-tracking tracker, sensor data; obtaining, by a second camera of the self-tracking tracker, a second image; generating, by a second processor of the self-tracking tracker, a self-tracking result of the self-tracking tracker based on the sensor data; generating, by the second processor of the self-tracking tracker, a second tracking result of the user based on the second image and the self-tracking result; and updating, by the first processor of the HMD device, an avatar of the user in the virtual world based on the first tracking result and the second tracking result.

In this disclosure, a self-tracking tracker is provided. The self-tracking tracker includes a tracking sensor, a camera, a processor, and a network module. The tracking sensor is configured to detect sensor data. The camera is configured to obtain a user image. The processor is configured to generate a self-tracking result based on the sensor data and to generate a tracking result based on the user image and the self-tracking result. The network module is configured to provide the tracking result for updating an avatar of the user in the virtual world.

Based on the above, according to the tracking system, the tracking method, and the self-tracking tracker, the avatar of the user may respond to the actions of the user in real-time and correctly, thereby increasing the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic flowchart of a tracking method according to an embodiment of the disclosure.

DESCRIPTION OF THE EMBODIMENTS

Figure 1A:
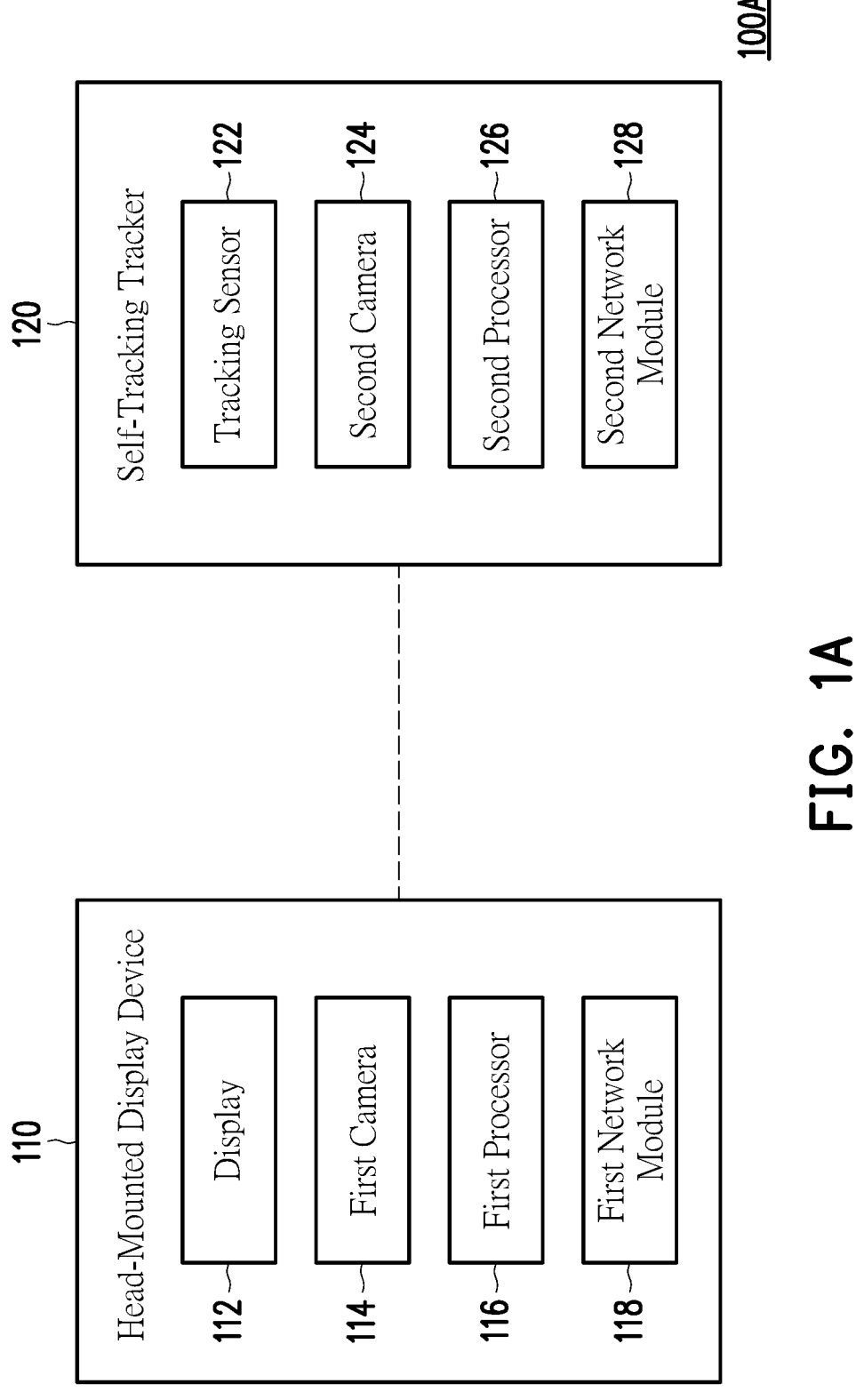
FIG. 1A is a schematic diagram of a hardware structure of a tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

A head-mounted display (HMD) device may be used to bring the user into the virtual world. In one embodiment, the HMD device may include a display and a camera. The display may be configured to display a virtual world and the camera may be configured to capture images for tracking of the user. However, the field of view of the camera is limited.

For example, while a hand of user is out of the field of view of the camera, the tracking of the hand may not be performed properly.

An extra camera may be used to reduce the blind spots of the tracking. However, while the extra camera is moved (e.g., by the user), the images captures by the extra camera may result in wrong tracking. That is, the movement of the extra camera may be recognized as the movement of the user. Therefore, it is the pursuit of people skilled in the art to provide a solution to perform the tracking properly.

FIG. 1A is a schematic diagram of a hardware structure of a tracking system according to an embodiment of the disclosure. With reference to FIG. 1A, a tracking system 100A may include an HMD device 110 and a self-tracking tracker 120. The HMD device 110 may include a display 112, a first camera 114, a first processor 116, and a first network module 118. The self-tracking tracker 120 may include a tracking sensor 122, a second camera 124, a second processor 126, and a second network module 128.

In one embodiment, the HMD device 110 may be adapted to be worn on a head of a user. The display 112 may be configured to display a virtual world. The first camera 114 may be configured to obtain a first image. The first processor 116 may be configured to generate a first tracking result of the user based on the first image. The tracking sensor 122 may be configured to detect sensor data. The second camera 124 may be configured to obtain a second image. The second processor 126 may be configured to generate a self-tracking result based on the sensor data. Further, the second processor 126 may be configured to generate a second tracking result based on the second image and the self-tracking result. The second network module 128 may be configured to provide the second tracking result to the first network module 118. In addition, the first processor 116 may be further configured to update an avatar of the user in the virtual world based on the first tracking result and the second tracking result.

In one embodiment, the HMD device 110 may be configured to display content of AR, VR, MR, or XR. The HMD device 110 may include, for example, a headset, wearable glasses (e.g., AR/VR goggles), other similar devices adapted for AR, VR, MR, XR, other reality related technologies, or a combination of these devices. However, this disclosure is not limited thereto.

In one embodiment, the display 112 may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto.

In one embodiment, the first camera 114 and/or the second camera 124, may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. However, this disclosure is not limited thereto.

In one embodiment, the first processor 116 and/or the second processor 126 may include, for example, a micro-controller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the first processor 116 and/or the second processor 126 may be achieved as multiple program codes. The program codes are stored in a memory, and executed by the first processor 116 and/or the second processor 126. Alternatively, in an embodiment, each of the functions of the first processor 116 and/or the second processor 126 may be achieved as one or more circuits. The disclosure does not limit the use of software or hardware to achieve the functions of the first processor 116 and/or the second processor 126.

In one embodiment, the first network module 118 and/or the second network module 128 may include, for example, a wired network module, a wireless network module, a Bluetooth module, an infrared module, a radio frequency identification (RFID) module, a Zigbee network module, or a near field communication (NFC) network module. However, this disclosure is not limited thereto. That is, the HMD device 110 may be configured to communicate with the self-tracking tracker 120 through either wired communication or wireless communication.

In one embodiment, the tracking sensor 122 may include, for example, a gyroscope, an accelerometer, an inertial measurement unit (IMU) sensor, other similar devices, or a combination of these devices. This disclosure is not limited thereto. In one embodiment, the tracking sensor 122 is a gyroscope and the sensor data includes three angular velocities in three degrees of freedom (DOF). The three angular velocities may include a roll angular velocity about an X axis, a pitch angular velocity about a Y axis, and a yaw angular velocity about a Z axis. In one embodiment, the tracking sensor 122 is an accelerometer and the sensor data includes three linear acceleration values in three degrees of freedom. The three linear acceleration values may include a first acceleration value along the X axis, a second acceleration value along the Y axis, and a third acceleration value along the Z axis. In one embodiment, the tracking sensor 122 is an IMU sensor including a gyroscope and an accelerometer and the sensor data includes changes in six degrees of freedom and the changes in the six degrees of freedom includes the three angular velocities corresponding to three perpendicular axes (e.g., X, Y, Z axes) and the three linear acceleration values corresponding to the three perpendicular axes. However, this disclosure is not limited thereto.

In one embodiment, the HMD device 110 may further include an inertial camera. The inertial camera may be configured to obtain an eye image of an eye of the user. Based on the eye image, the first processor 116 may be configured to perform eye gaze tracking. That is, an eye gaze point may be determined by the eye gaze tracking. Therefore, in the virtual world, the eyes of an avatar of the user may be able to reflect the eye movements of the eyes of the user in the real world.

In one embodiment, the self-tracking tracker 120 may be adapted to be hold by the hand of the user. Further, the self-tracking tracker 120 may include at least one physical button. That is, the self-tracking tracker 120 may be configured to receive a user instruction from the user through the physical button.

In this manner, through the collaboration of the first camera 114 and the second camera 124, the tracking system 100A is able to track the hand of the user without occlusion. Moreover, since the self-tracking tracker 120 is able to track itself based on the sensor data of the tracking sensor 122, the movement of the self-tracking tracker 120 won't be recognized as the movement of the user. Therefore, the wrong tracking of the user is reduced and the user experience is improved.

Figure 1B:
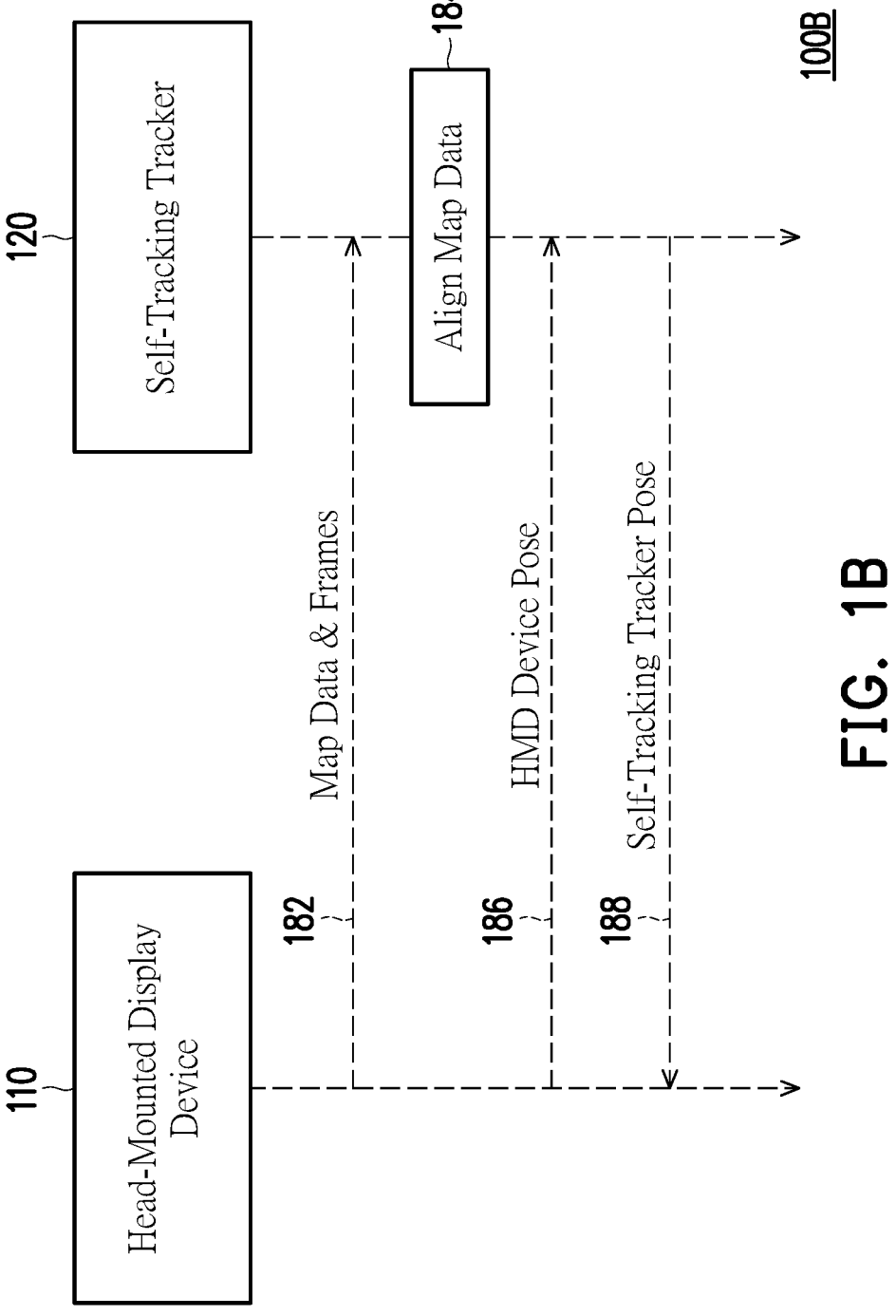
FIG. 1B is a schematic diagram of a software structure of a tracking system according to an embodiment of the disclosure.

FIG. 1B is a schematic diagram of a software structure of a tracking system according to an embodiment of the disclosure. With reference to FIG. 1A and FIG. 1B, the software structure 100B of the tracking system 100A may include the HMD device 110 and the self-tracking tracker 120. The HMD device 110 may be configured to communicate with the self-tracking tracker 120 through either wired communication or wireless communication. It is noted that, each step or function of the software structure 100B may be performed by the first processor 116 and the second processor 126, or may be achieved as one or more circuits. However, this disclosure is not limited thereto.

In one embodiment, in a step 182, the first processor 116 of the HMD device 110 may be configured to generate a first simultaneous localization and mapping (SLAM) map around the user (i.e., around the HMD device 110) based on the first image by performing a SLAM algorithm. Moreover, the HMD device 110 may be configured to provide map data of the first SLAM map and frames to the self-tracking tracker 120. The map data may include layout of the environment around the user and coordinates of objects in the environment. The frames may include at least part a plurality of the first images and time points corresponding to the plurality of the first images.

In addition, the second processor 126 of the self-tracking tracker 120 may be configured to generate a second SLAM map around the user (i.e., around the self-tracking tracker 120) based on the second image by performing a SLAM algorithm. Further, in a step 184, in response to receiving map data and frames from the HMD device 110, the second processor 126 may be configured to align the first SLAM map with the second SLAM map. That is, the self-tracking tracker 120 is able to determine an absolution position of the self-tracking tracker 120 in the environment and a relative position from the HMD device 110 or the user. In other words, the self-tracking tracker 120 may be configured to determine a relative distance from the self-tracking tracker 120 to the HMD device 110.

In a step 186, the HMD device 110 may be configured to provide an HMD device pose to the self-tracking tracker 120. The HMD pose may include a coordinate of the HMD device 110 in the environment. In a step 188, the self-tracking tracker 120 may be configured to provide a self-tracking tracker pose to the HMD device 110. The self-tracking tracker pose may include a coordinate of the self-tracking tracker 120 in the environment. The self-tracking tracker pose may be determined or updated based on both of the second image and the sensor data or based on the sensor data solely. That is, the second processor 126 may be configured to update (i.e., determine) the relative distance from the self-tracking tracker 120 to the HMD device 110 based on the sensor data. It is noted that, the HMD pose and the self-tracking tracker pose may not include any images, thereby reducing the amount of data transmission between the HMD device 110 and the self-tracking tracker 120. By repetitively performing the step 186 and the step 188, the HMD device 110 and the self-tracking tracker 120 are able to know the position of each other.

Figure 2A:
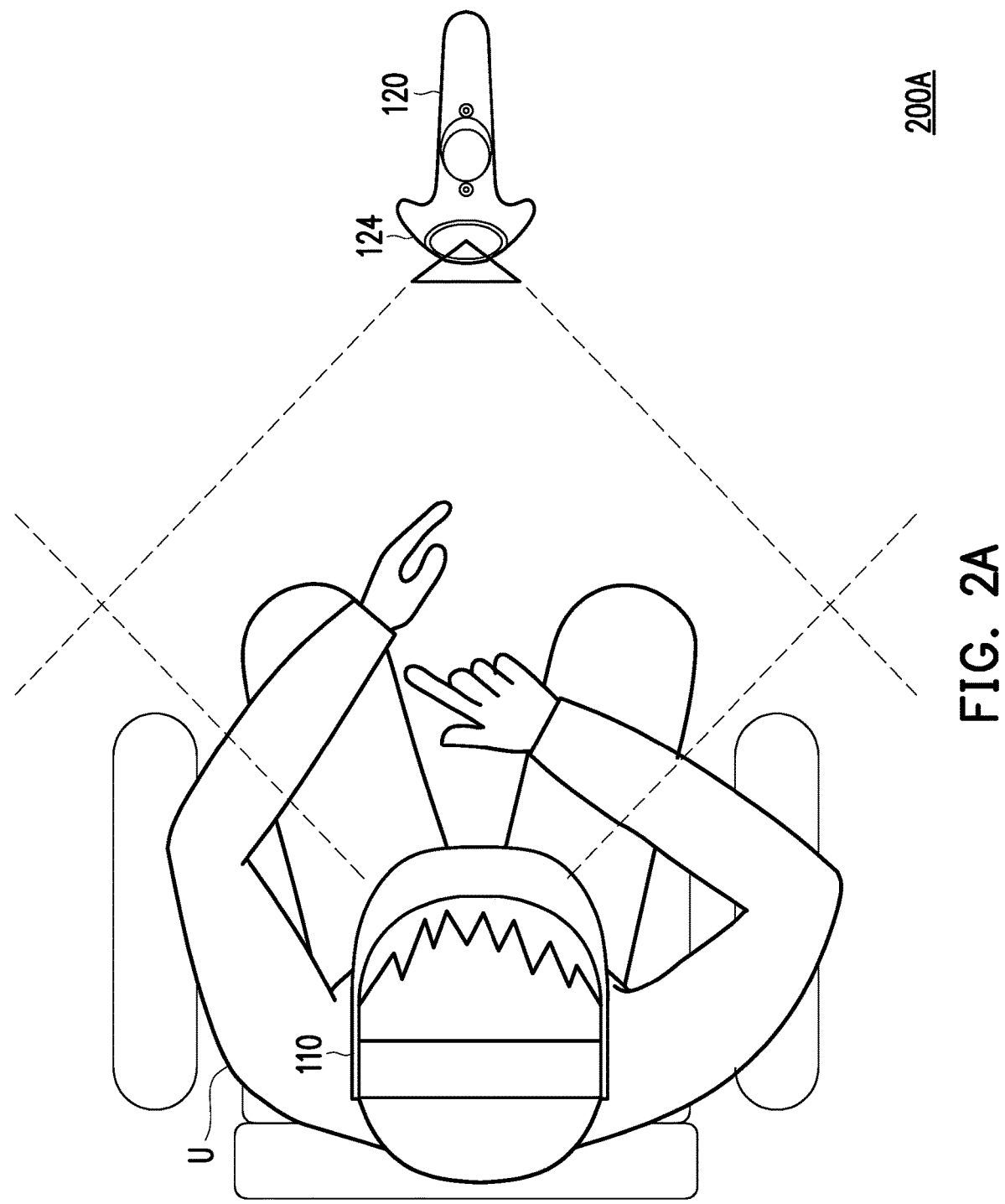
FIG. 2A is a schematic diagram of a tracking scenario of a tracking system according to an embodiment of the disclosure.

FIG. 2A is a schematic diagram of a tracking scenario of a tracking system according to an embodiment of the disclosure. With reference to FIG. 1A to FIG. 2A, a tracking scenario 200A of the tracking system 100A depicts how the self-tracking tracker 120 improve the quality of tracking by reducing the blind spots of the tracking system 100A.

In one embodiment, while a first hand of the user U is in front of a second hand of the user U, the first camera 114 of the HMD device 110 may not be able to obtain images of the first hand directly. That is, while one hand is blocked by or overlapped with the other hand, the HMD device 110 may not be able to perform the hand tracking properly. Under such circumstances, the second camera 124 of the self-tracking tracker 120 may be able to obtain images of the first hand. The processor 126 of the self-tracking tracker 120 may be configured to perform the hand tracking and provide the hand tracking result to the HMD device 110. In this manner, the blind spots of the tracking system 100A are reduced, thereby improving the user experience.

Figure 2B:
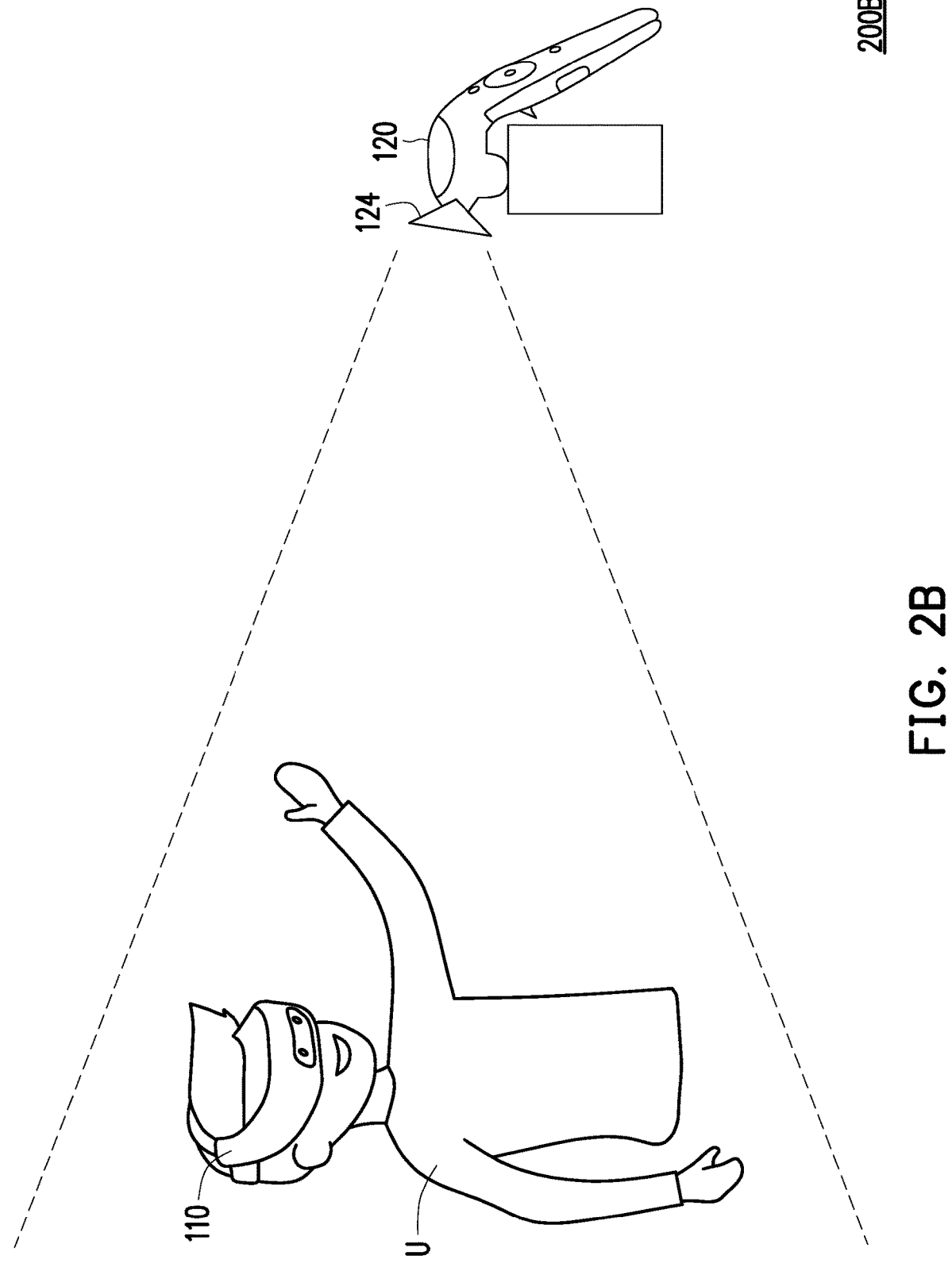
FIG. 2B is a schematic diagram of a tracking scenario of a tracking system according to an embodiment of the disclosure.
Figure 2C:
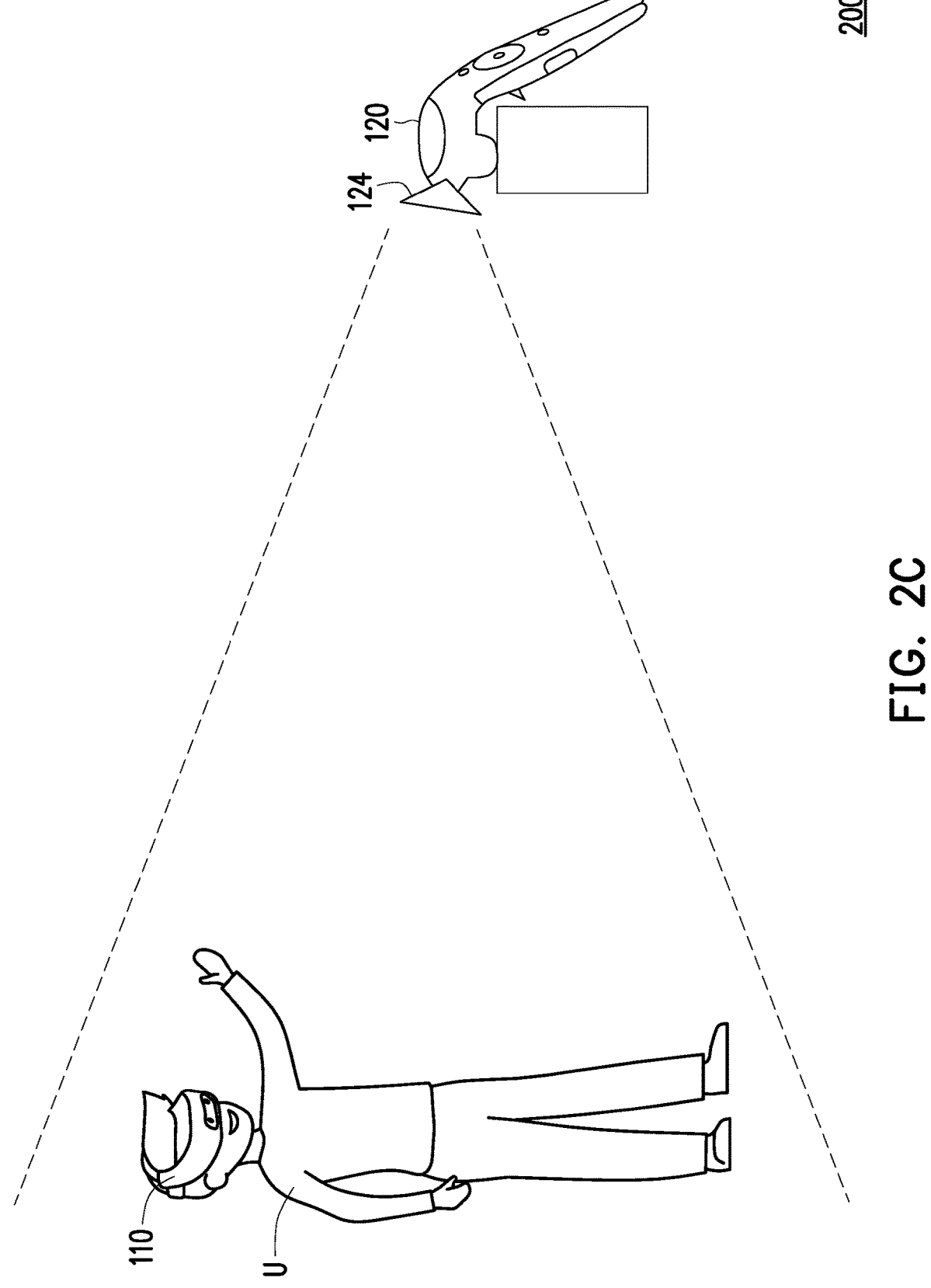
FIG. 2C is a schematic diagram of a tracking scenario of a tracking system according to an embodiment of the disclosure.

FIG. 2B is a schematic diagram of a tracking scenario of a tracking system according to an embodiment of the disclosure. FIG. 2C is a schematic diagram of a tracking scenario of a tracking system according to an embodiment of the disclosure. With reference to FIG. 1A to FIG. 2B, a tracking scenario 200B of the tracking system 100A depicts how the self-tracking tracker 120 tracks the upper body of the user U and a tracking scenario 200C of the tracking system 100A depicts how the self-tracking tracker 120 tracks the full body of the user U.

While the self-tracking tracker 120 is disposed close to the user U, the self-tracking tracker 120 may track the upper body of the user U. On the other hand, while the self-tracking tracker 120 is disposed far away from the user U, the self-tracking tracker 120 may track the full body of the user U. In other words, in response to the relative distance being smaller than a threshold distance, the self-tracking tracker 120 may be configured perform an upper body tracking of the user U based on the second image. Further, in response to the relative distance being not smaller than the threshold distance, the self-tracking tracker 120 may be configured perform a full body tracking of the user U based on the second image.

That is, the self-tracking tracker 120 may be configured to determine performing the upper body tracking or the full body tracking based on the relative distance from the self-tracking tracker 120 to the user U. However, this disclosure is not limited thereto. In another embodiment, the self-tracking tracker 120 may be configured to determine performing the upper body tracking or the full body tracking based on a user instruction from the user U.

Figure 3:
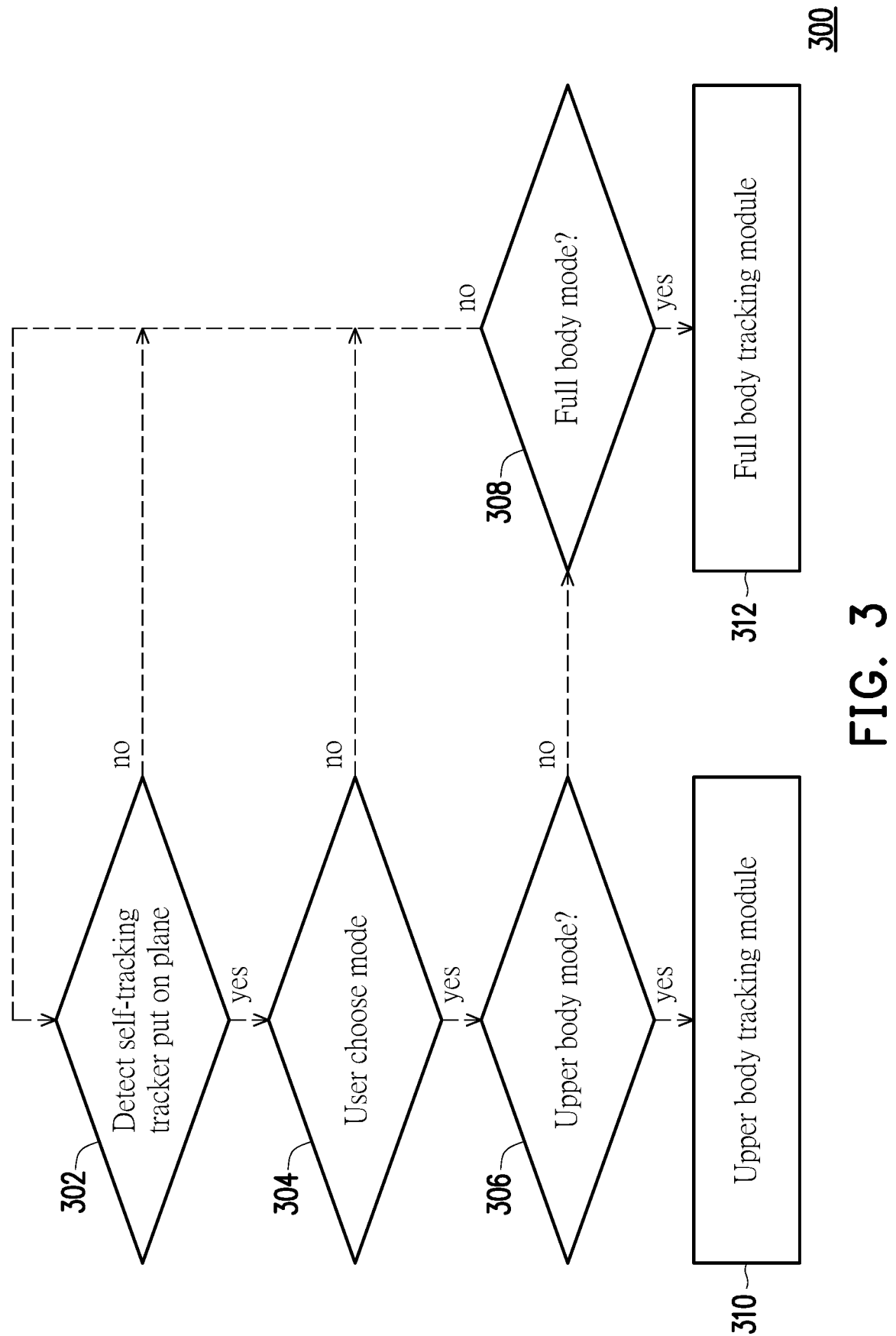
FIG. 3 is a schematic diagram of a software structure of a tracking system according to an embodiment of the disclosure.

FIG. 3 is a schematic diagram of a software structure of a tracking system according to an embodiment of the disclosure. With reference to FIG. 1 to FIG. 3, a software structure 300 of the tracking system 100A depicts an exemplary embodiment for the self-tracking tracker 120 of FIG. 2B and FIG. 2C. It is noted that, each step or function of the software structure 300 may be performed by the second processor 126 or may be achieved as one or more circuits. However, this disclosure is not limited thereto.

In a step 302, the self-tracking tracker 120 may be configured to detect whether the self-tracking tracker 120 is placed stably. For example, the self-tracking tracker 120 may be configured to detect whether the self-tracking tracker 120 is put on a plane or hanged on a wall utilizing the second SLAM map. However, this disclosure is not limited thereto. In one embodiment, the self-tracking tracker 120 may be configured to detect whether the self-tracking tracker 120 is placed stably based on the sensor data of the tracking sensor 122. That is, the self-tracking tracker 120 is able to detect whether the self-tracking tracker 120 is placed stably utilizing either the second image of the second camera 124 or the sensor data of the tracking 122 sensor and this disclosure is not limited thereto. It is noted that, while the self-tracking tracker 120 is placed stably, the quality of the tracking is more accurate. Besides, in response to the self-tracking tracker 120 not being placed stably, the step 302 may be performed repetitively.

In a step 304, in response to the self-tracking tracker 120 being placed stably, the self-tracking tracker 120 may be configured to receive a user instruction from the user U. The use instruction may include the user U choosing a mode of the self-tracking tracker 120. The modes of the self-tracking tracker 120 may include an upper body mode and a full body mode. Besides, in response to no user instruction being received, the step 302 may be performed again.

In a step S306, in response receiving the user instruction indicating the mode of the self-tracking tracker 120, the self-tracking tracker 120 may be configured to check whether the selected mode is the upper body mode or not. In a step 310, in response to the to the selected mode being the upper body mode, the second processor 126 may be configured to execute an upper body tracking module to perform the upper body tracking of the user U.

In a step S308, in response to the selected mode not being the upper body mode, the self-tracking tracker 120 may be configured to check whether the selected mode is the full body mode or not. In a step 312, in response to the to the selected mode being the full body mode, the second processor 126 may be configured to execute a full body tracking module to perform the full body tracking of the user U. In this manner, the mode of the tracking of the self-tracking tracker 120 may be selected by the user U. However, this disclosure is not limited thereto. In another embodiment, the mode of the tracking of the self-tracking tracker 120 may be determined based on the relative distance from the self-tracking tracker 120 to the user U.

Figure 4A:
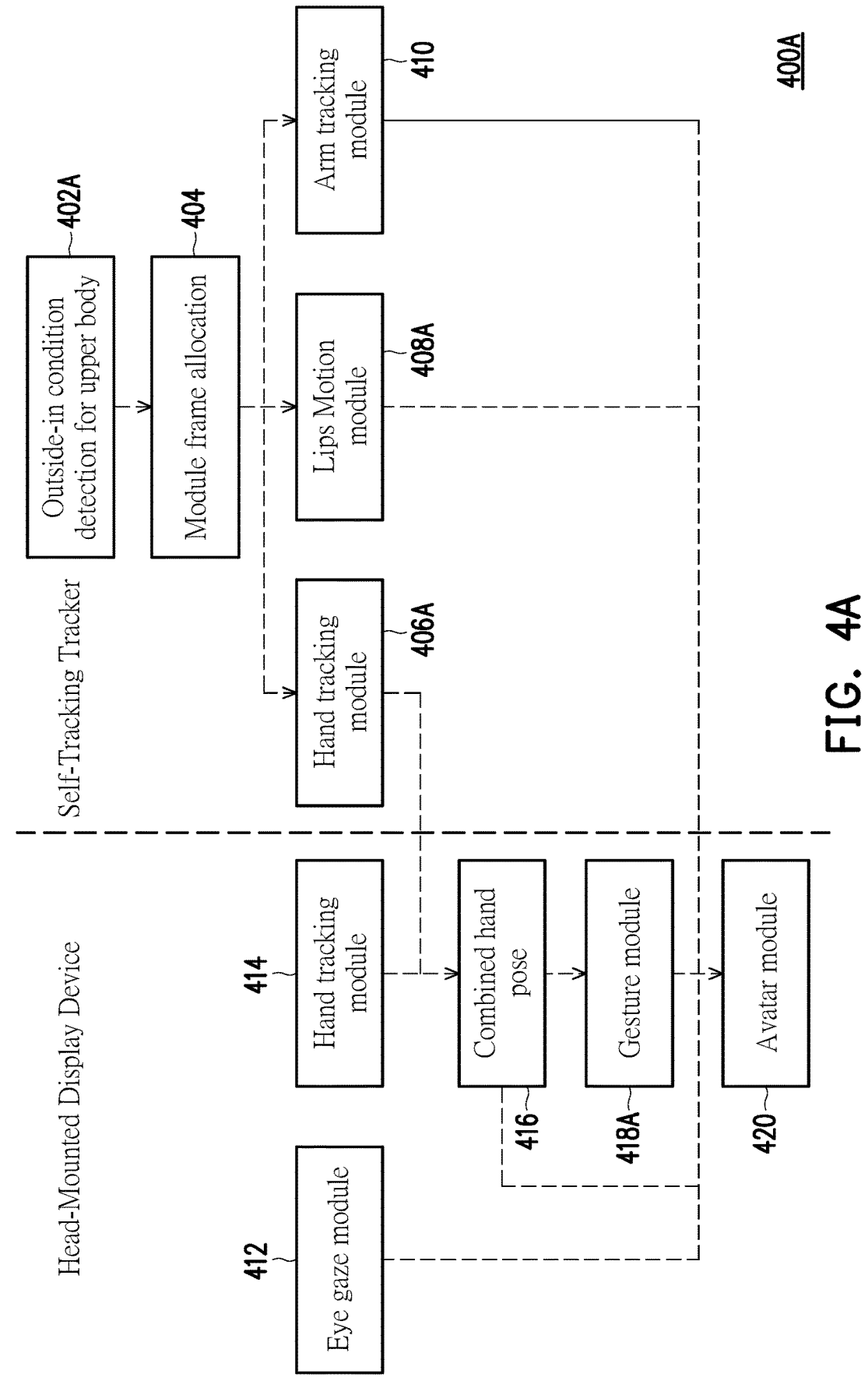
FIG. 4A is a schematic diagram of a software structure of a tracking system according to an embodiment of the disclosure.

FIG. 4A is a schematic diagram of a software structure of a tracking system according to an embodiment of the disclosure. With reference to FIG. 1 to FIG. 4A, a software structure 400A of the tracking system 100A depicts how the tracking system 100A performs the upper body tracking. It is noted that, each step or function of the software structure 400A may be performed by the first processor 116 and the second processor 126, or may be achieved as one or more circuits. However, this disclosure is not limited thereto.

In a step 402A, in response to the relative distance being smaller than the threshold distance or the user instruction indicating the upper body mode being selected, the self-tracking tracker 120 may be configured to perform the outside-in condition detection for upper body of the user U. In a step 404, the self-tracking tracker 120 may be configure to allocate the frames of images obtained by the second camera 124 for a plurality of modules executed by the second processor 126. In a step 406A, the second processor 126 may be configure to execute a hand tracking module to perform a hand tracking of hands of the user U. In a step 408A, the second processor 126 may be configure to execute a lips motion module to perform a lip tracking of lips of the user U. In a step 410, the second processor 126 may be configure to execute an arm tracking module to perform an arm tracking of arms of the user U.

In a step 412, the first processor 116 may be configure to execute an eye gaze module to perform an eye tracking of eyes of the user U. In a step 414, the first processor 116 may be configure to execute a hand tracking module to perform a hand tracking of hands of the user U. In a step 416, the first processor 116 may be configure to perform a fusion process to combine the hand tracking result from the self-tracking tracker 120 (i.e., the step 406A) and the hand tracking result from the HMD device 110 (i.e., the step 414). That is, a combined hand pose may be determined by the fusion process. In a step 418A, the first processor 116 may be configure to analyze hand gesture of the user U based on the combined hand pose.

In a step 420, the first processor 116 may be configure to update a virtual pose of an avatar of the user U based on all the tracking result from the step 406A to 418A. Further, the display 112 of the HMD device 110 may be configured to display the updated avatar of the user U in real-time and correctly.

Figure 4B:
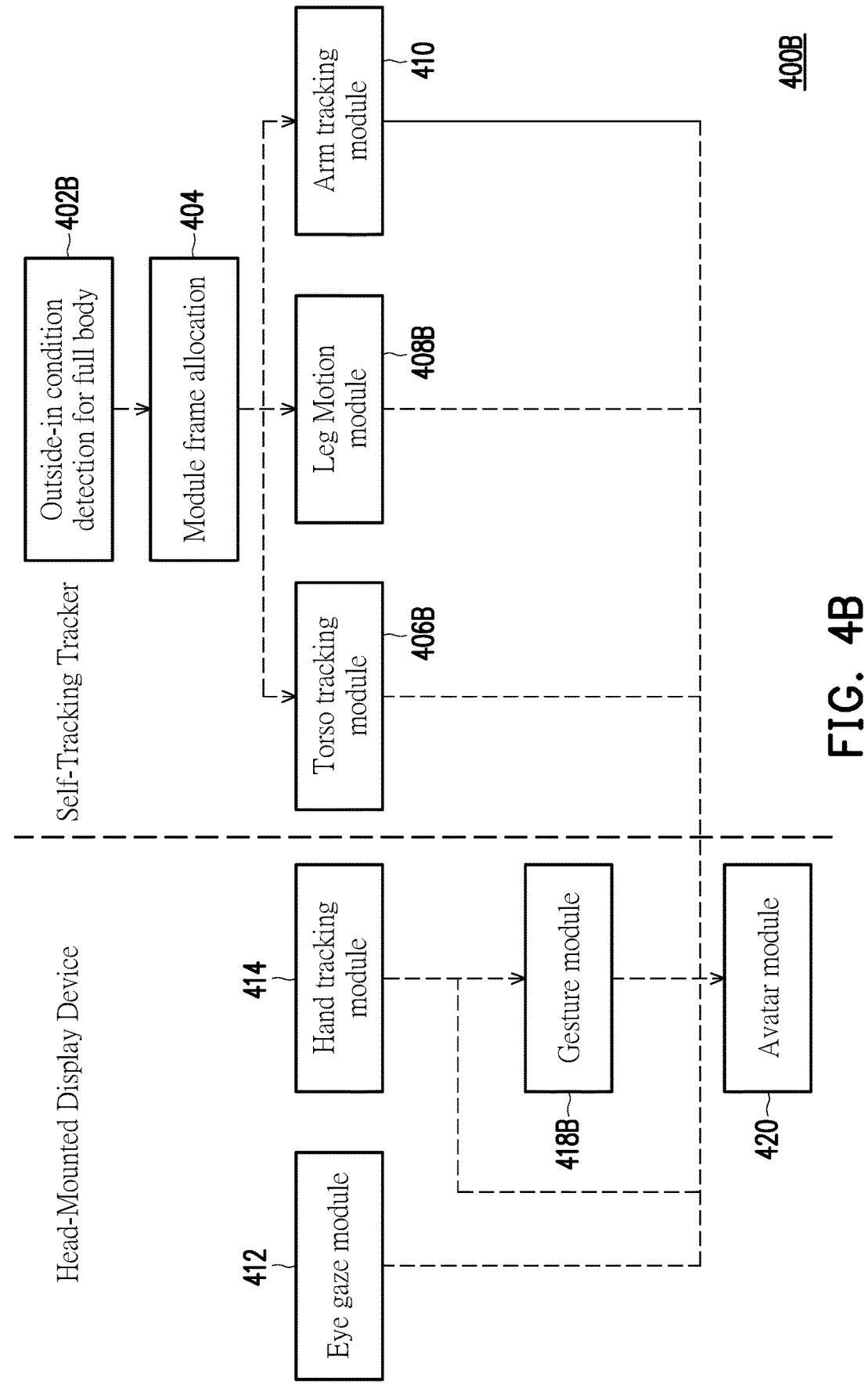
FIG. 4B is a schematic diagram of a software structure of a tracking system according to an embodiment of the disclosure.

FIG. 4B is a schematic diagram of a software structure of a tracking system according to an embodiment of the disclosure. With reference to FIG. 1 to FIG. 4B, a software structure 400B of the tracking system 100A depicts how the tracking system 100A performs the full body tracking. It is noted that, each step or function of the software structure 400B may be performed by the first processor 116 and the second processor 126, or may be achieved as one or more circuits. However, this disclosure is not limited thereto.

In a step 402B, in response to the relative distance being not smaller than the threshold distance or the user instruction indicating the full body mode being selected, the self-tracking tracker 120 may be configured to perform the outside-in condition detection for full body of the user U. In a step 404, the self-tracking tracker 120 may be configure to allocate the frames of images obtained by the second camera 124 for a plurality of modules executed by the second processor 126. In a step 406B, the second processor 126 may be configure to execute a torso tracking module to perform a torso tracking of the torso of the user U. In a step 408B, the second processor 126 may be configure to execute a leg motion module to perform a leg tracking of legs of the user U. In a step 410, the second processor 126 may be configure to execute an arm tracking module to perform an arm tracking of arms of the user U.

In a step 412, the first processor 116 may be configure to execute an eye gaze module to perform an eye tracking of eyes of the user U. In a step 414, the first processor 116 may be configure to execute a hand tracking module to perform a hand tracking of hands of the user U. In a step 418B, the first processor 116 may be configure to analyze hand gesture of the user U based on the hand tracking result in the step 414.

In a step 420, the first processor 116 may be configure to update a virtual pose of an avatar of the user U based on all the tracking result from the step 406B to 418B. Further, the display 112 of the HMD device 110 may be configured to display the updated avatar of the user U. In this manner, the avatar of the user U may respond to the actions of the user U in real-time and correctly.

It is noted that, comparing the FIG. 4A with the FIG. 4B, the self-tracking tracker 120 may be configured to only perform the hand tracking and the lip tracking in the upper body tracking mode. On the other hand, the self-tracking tracker 120 may be configured to perform the torso tracking and the leg tracking in the full body tracking mode. The reason is that while the upper body mode is selected, the upper body mode is selected either due to the user instruction or the self-tracking tracker 120 being close to the user U. That is, the user U may want to emphasize the tracking of the upper body instead of full body. Or, the second camera 124 may be close enough to gather details of the hands or the lips of the user U. Similarly, while the full body mode is selected, the full body mode is selected either due to the user instruction or the self-tracking tracker 120 being far away from the user U. That is, the user U may want to emphasize the tracking of the full body instead of upper body. Or, the second camera 124 may be too far way to gather details of the hands or the lips of the user U. In this manner, the mode of the tracking of the self-tracking tracker 120 may be selected properly. Therefore, the quality of the tracking is enhanced, thereby improving the user experience.

Figure 5A:
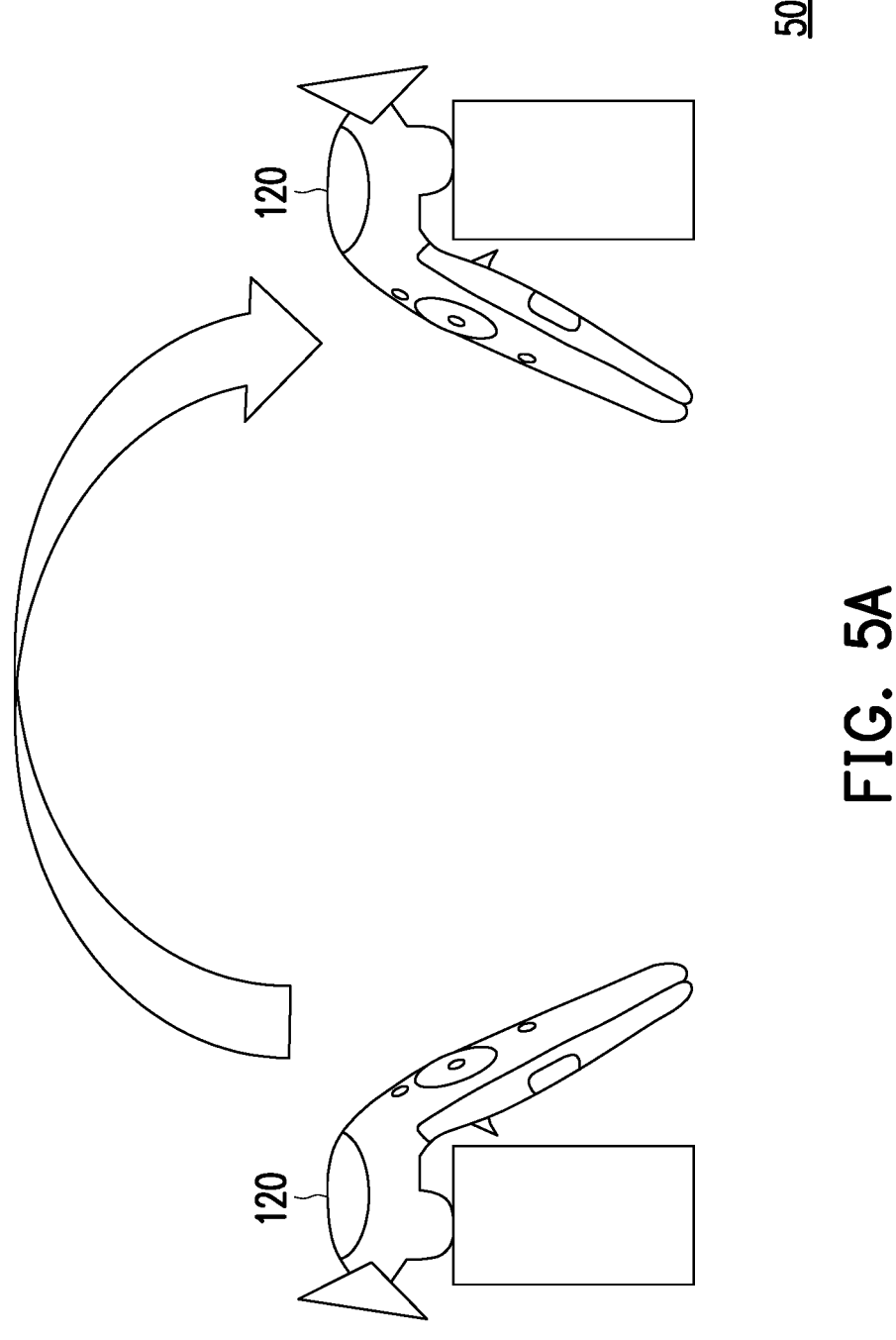
FIG. 5A is a schematic diagram of a tracking scenario of a self-tracking tracker according to an embodiment of the disclosure.

FIG. 5A is a schematic diagram of a tracking scenario of a self-tracking tracker according to an embodiment of the disclosure. With reference to FIG. 1 to FIG. 5A, a tracking scenario 500A depicts how the self-tracking tracker 120 responds to a change of position of the self-tracking tracker 120 itself.

Since the self-tracking tracker 120 include the tracking sensor 122 and the second camera 124, the second processor 126 may be configured to determine the pose of the self-tracking tracker 120 itself (i.e., the self-tracking tracker pose) based on the second image and/or the sensor data. Based on the self-tracking tracker pose, the second processor 126 may be configured to perform the tracking of the user U properly. In other words, the second processor 126 may be configured to generate the tracking result of the user U based on not only the second image but also the sensor data. Therefore, the chance of wrong tracking of the user U may be reduced. For example, as depicted in FIG. 5A, while the self-tracking tracker 120 is turned in another direction, the change of direction of the self-tracking tracker 120 does not cause the change of direction of the avatar of the user U. In this manner, the avatar of the user U may only respond to the actions of the user U, thereby improving the user experience.

It is noted that, since the self-tracking tracker 120 is able to track the self-tracking tracker 120 itself and track the user U without the help of the HMD device 110, the self-tracking tracker 120 may be utilized solely to track the user U. For example, the self-tracking tracker 120 may be configured to track the self-tracking tracker 120 based on the sensor data of the tracking sensor 122 to generate a self-tracking result. Further, the self-tracking tracker 120 may be configured to track the upper body or the full body of the user U based on a user image obtain by the camera (i.e., the second camera 124) and the self-tracking result to generate a tracking result of the user U. Then, the network module (e.g., the second network module 128) of the self-tracking tracker 120 may be configured to provide the tracking result to a server directly. Based on the tracking result, the server may be configured to update the avatar of the user U in the virtual world. Moreover, the self-tracking tracker 120 may be utilized with an electronic device with a display, such as a tablet, a smartphone, a projector, a laptop, or other similar devices. The self-tracking tracker 120 may be configured to provide the tracking result to the electronic device. The electronic device may be configured to update the avatar of the user U and display the avatar of the user U in the virtual world. Therefore, the self-tracking tracker 120 may be utilized without the HMD device 110 and may be used more flexibly in various situations.

Figure 5B:
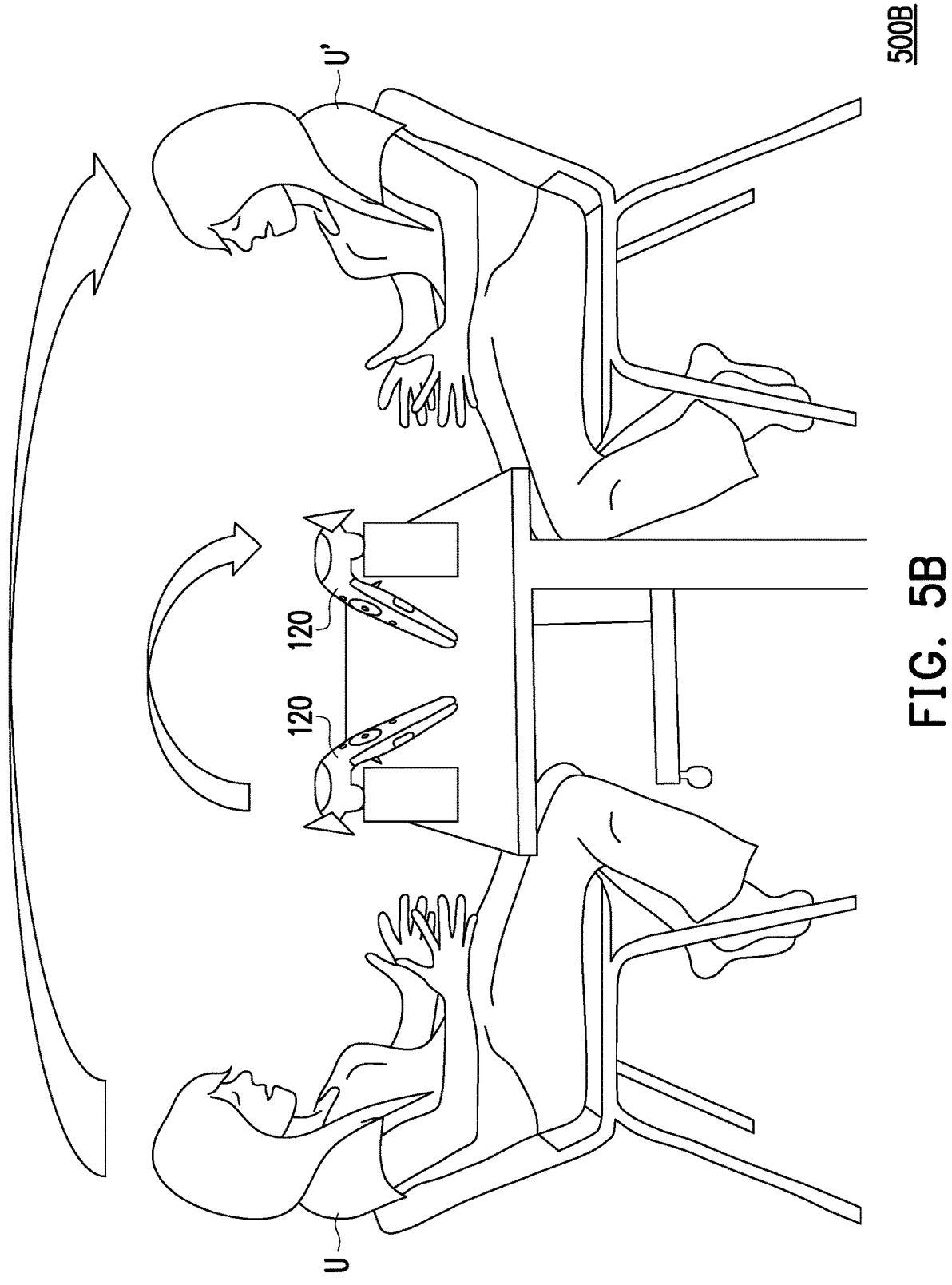
FIG. 5B is a schematic diagram of a tracking scenario of a self-tracking tracker according to an embodiment of the disclosure.

FIG. 5B is a schematic diagram of a tracking scenario of a self-tracking tracker according to an embodiment of the disclosure. With reference to FIG. 1 to FIG. 5B, a tracking scenario 500B depicts how the self-tracking tracker 120 responds to a change of position of the self-tracking tracker 120 itself. In the tracking scenario 500B, the user U may represent a person in an original seat and the user U' may represent the user U after changing a seat.

In one embodiment, the user U may utilize the self-tracking tracker 120 to track the user U himself/herself. The self-tracking tracker 120 may be configured to track the self-tracking tracker 120 itself and the user U to generate the tracking result for updating an avatar of the user U in the virtual world. Due to all kinds of reasons, the user U may want to change a seat during the tracking of the self-tracking tracker 120. The user U may change the seat first and then change the direction or position of the self-tracking tracker 120. On the other hand, the user U may change the direction or position of the self-tracking tracker 120 first and then change the seat. Since the self-tracking tracker 120 is able to track the self-tracking tracker 120 itself, while the user U change the direction or the position of the self-tracking tracker 120, the change of the direction or the position of the self-tracking tracker 120 does not result in the change of the direction or the position of the avatar of the user U in the virtual world. That is, the direction or the position of the avatar of the user U may only be updated while the user U changes his/her direction or position in the real world. Therefore, the wrong tracking of the user U is reduced and the user experience is improved.

Moreover, while the user U is change his/her position, the self-tracking tracker 120 may be configured to update the avatar of the user U in real-time. That is, the movement of the user U may look smoothly instead of looking like a teleportation. For example, the user U may prepare a speech podium in the real world. When the self-tracking tracker 120 detects that the user U is moving towards the speech podium, the self-tracking tracker 120 may be configured to update the avatar of the user U in real-time. That is, the avatar of the user U in the virtual world may look like the avatar is walking to a virtual speech podium in the virtual world smoothly. Therefore, the visual effect in the virtual world is closer to the feeling in the real world, thereby improving the user experience.

Figure 5C:
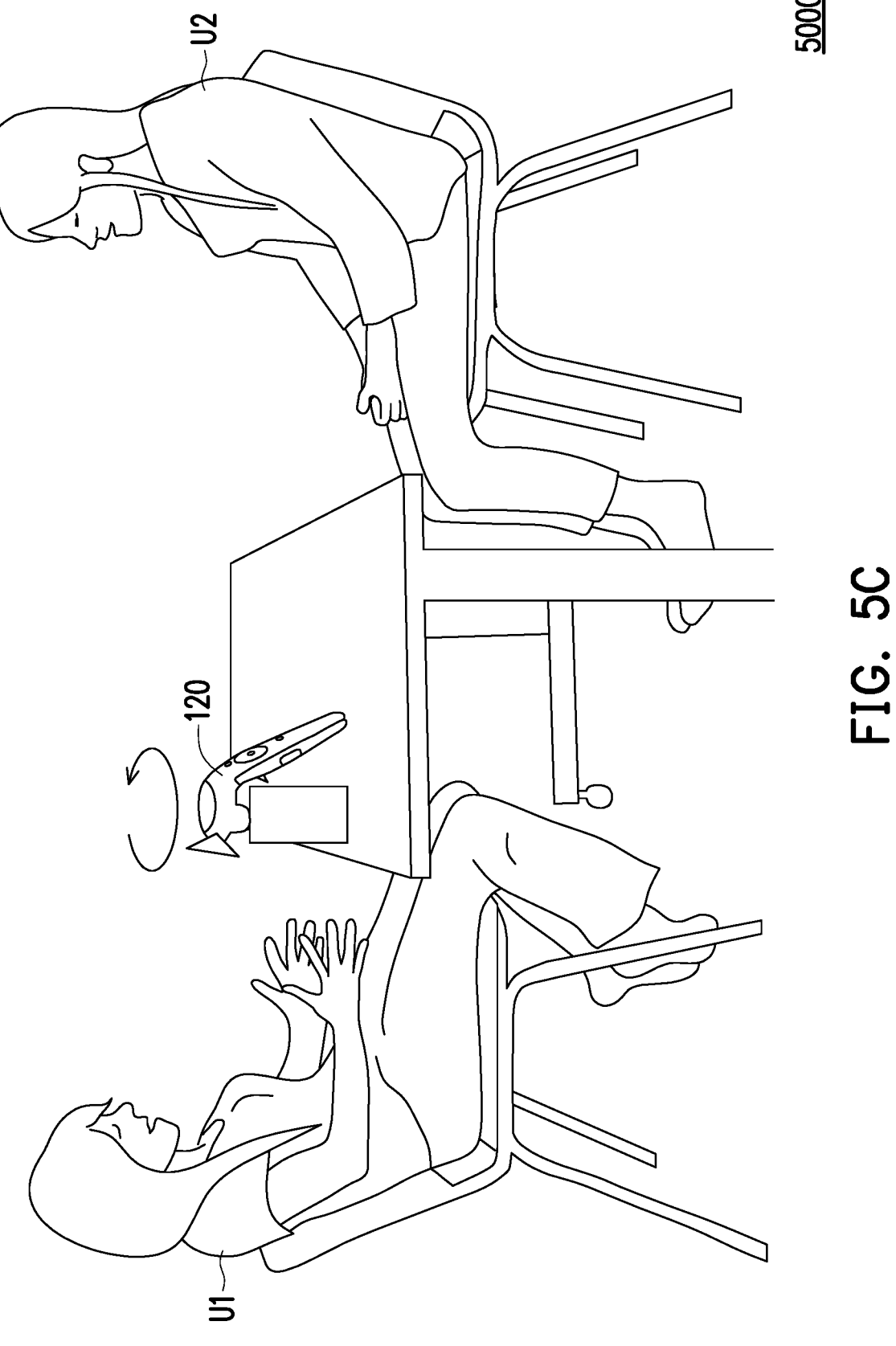
FIG. 5C is a schematic diagram of a tracking scenario of a self-tracking tracker according to an embodiment of the disclosure.

FIG. 5C is a schematic diagram of a tracking scenario of a self-tracking tracker according to an embodiment of the disclosure. With reference to FIG. 1 to FIG. 5C, a tracking scenario 500C depicts how the self-tracking tracker 120 responds to a change of position of the self-tracking tracker 120 itself. In the tracking scenario 500C, the user U1 may represent a person the self-tracking tracker 120 is originally facing and the user U2 may represent a person the self-tracking tracker 120 is facing after the self-tracking tracker 120 changing direction or position.

In one embodiment, the user U1 and the user U2 may the self-tracking tracker 120 to track themselves. However, the user U1 and the user U2 may not sit next to each other. That is, the camera of the self-tracking tracker 120 may not be able to obtain images of the user U1 and the user U2 at the same time. Under such circumstances, the user U1 and the user U2 may share the self-tracking tracker 120. For example, while the user U1 want to speak or present something, the user U1 may turn the self-tracking tracker 120 facing towards the user U1. The self-tracking tracker 120 may be configured to recognize the face of the user U1 and update an avatar corresponding to the user U1. On the other hand, while the user U2 want to speak or present something, the user U2 may turn the self-tracking tracker 120 facing towards the user U2. The self-tracking tracker 120 may be configured to recognize the face of the user U2 and update an avatar corresponding to the user U2. That is, even if more than one person is utilizing the self-tracking tracker 120 for updating an avatar, the tracking of all the people is still performed correctly.

It is noted that, since the self-tracking tracker 120 is able to track the self-tracking tracker 120 itself, while the user U1 or the user U2 change the direction or the position of the self-tracking tracker 120, the change of the direction or the position of the self-tracking tracker 120 does not result in the change of the direction or the position of the avatar of the user U1 or the user U2 in the virtual world. That is, the direction or the position of the avatar of the user U1 or the user U2 may only be updated while the user U1 or U2 changes his/her direction or position in the real world.

Therefore, the wrong tracking of the user U1 and the user U2 is reduced and the user experience is improved.

FIG. 6 is a schematic flowchart of a tracking method according to an embodiment of the disclosure. With reference to FIG. 1A to FIG. 6, a tracking method 600 may include a step S602, a step S604, a step S606, a step S608, a step S610, a step S612, a step S614, and a step S616.

In the step S602, a virtual world may be displayed by the display 112 of the HMD device 110. In the step S602, a first image may be obtained by the first camera 114 of the HMD device 110. In the step S606, a first tracking result of the user U may be generated based on the first image by the first processor 116 of the HMD device 110. In the step S608, sensor data may be detected by the tracking sensor 122 of the self-tracking tracker 120. In the step S610, a second image may be obtained by the second camera 124 of the self-tracking tracker 120. In the step S612, a self-tracking result of the self-tracking tracker 120 may be generated based on the sensor data by the second processor 126 of the self-tracking tracker 120. It is worth mentioned that, the HMD device 110 may provide the map data of a SLAM map to the self-tracking tracker 120, so that second processor 126 of the self-tracking tracker 120 may be configured to generate the self-tracking result based on the sensor data, the second image and the SLAM map. However, this disclosure is not limited thereto. In the step S614, a second tracking result of the user U may be generated based on the second image and the self-tracking result. In the step S616, an avatar of the user U in the virtual world may be updated based on the first tracking result and the second tracking by the first processor 116. In this manner, the avatar of the user U may respond to the actions of the user U in real-time and correctly, thereby increasing the user experience.

In addition, the implementation details of the tracking method 600 may be referred to the descriptions of FIG. 1 to FIG. 5C to obtain sufficient teachings, suggestions, and implementation embodiments, while the details are not redundantly described seriatim herein.

In summary, according to the tracking system 100A, the tracking method 600, and the self-tracking tracker 120, through the collaboration of the HMD device 110 and the self-tracking tracker 120, the tracking system 100A is able to track the user without occlusion. Moreover, since the self-tracking tracker 120 is able to track itself based on the sensor data of the tracking sensor 122, the movement of the self-tracking tracker 120 won't be recognized as the movement of the user. Therefore, the wrong tracking of the user is reduced and the user experience is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tracking system, comprising:
    a head-mounted display (HMD) device, adapted to be worn on a head of a user and comprising:
        a display, configured to display a virtual world;
        a first camera, configured to obtain a first image;
        a first processor, configured to generate a first tracking result of the user based on the first image; and
        a first network module; and
    a self-tracking tracker, comprising:
        a tracking sensor, configured to detect sensor data;
        a second camera, configured to obtain a second image;

a second processor, configured to:
　　generate a self-tracking result based on the sensor data; and
　　generate a second tracking result based on the second image and the self-tracking result; and
a second network module, configured to provide the second tracking result to the first network module,
wherein the first processor is further configured to update an avatar of the user in the virtual world based on the first tracking result and the second tracking result,
the self-tracking tracker is configured to detect whether the self-tracking tracker is placed stably on a plane or hanged on a wall based on the second image or the sensor data; and
in response to the self-tracking tracker not being placed stably, the second tracking result is not generated.

2. The tracking system according to claim 1, wherein the tracking sensor comprises an inertial measurement unit sensor and the sensor data comprises three angular velocities and three linear acceleration values.

3. The tracking system according to claim 1, wherein
the HMD device further comprises an internal camera and the internal camera is configured to obtain an eye image of an eye of the user, and
the first processor is further configured to perform eye gaze tracking based on the eye image.

4. The tracking system according to claim 1, wherein the self-tracking tracker is adapted to be hold by a hand of the user and configured to receive a user instruction from the user through a physical button.

5. The tracking system according to claim 1, wherein the first processor is further configured to:
　　generate a simultaneous localization and mapping (SLAM) map based on the first image by performing a simultaneous localization and mapping (SLAM) algorithm.

6. The tracking system according to claim 1, wherein the second processor is configured to determine a relative distance from the self-tracking tracker to the HMD device based on the sensor data.

7. The tracking system according to claim 6, wherein in response to the relative distance being smaller than a threshold distance, the self-tracking tracker is configured perform an upper body tracking of the user based on the second image.

8. The tracking system according to claim 6, wherein in response to the relative distance being not smaller than a threshold distance, the self-tracking tracker is configured perform a full body tracking of the user based on the second image.

9. A tracking method, comprising:
　　displaying, by a display of a head-mounted display (HMD) device, a virtual world;
　　obtaining, by a first camera of the HMD device, a first image;
　　generating, by a first processor of the HMD device, a first tracking result of a user based on the first image;
　　detecting, by a tracking sensor of a self-tracking tracker, sensor data;
　　obtaining, by a second camera of the self-tracking tracker, a second image;
　　generating, by a second processor of the self-tracking tracker, a self-tracking result of the self-tracking tracker based on the sensor data;
　　generating, by the second processor of the self-tracking tracker, a second tracking result of the user based on the second image and the self-tracking result;

updating, by the first processor of the HMD device, an avatar of the user in the virtual world based on the first tracking result and the second tracking result;
detecting, by the self-tracking tracker, whether the self-tracking tracker is placed stably on a plane or hanged on a wall based on the second image or the sensor data; and
in response to the self-tracking tracker not being placed stably, the second tracking result is not generated.

10. The tracking method according to claim 9, wherein the tracking sensor comprises an inertial measurement unit sensor and the sensor data comprises three angular velocities and three linear acceleration values.

11. The tracking method according to claim 9, further comprising:
　　obtaining an eye image of an eye of the user; and
　　performing eye gaze tracking based on the eye image.

12. The tracking method according to claim 9, further comprising:
　　receiving a user instruction from the user through a physical button.

13. The tracking method according to claim 9, further comprising:
　　generating a simultaneous localization and mapping (SLAM) map based on the first image by performing a simultaneous localization and mapping (SLAM) algorithm.

14. The tracking method according to claim 9, further comprising:
　　determining a relative distance from the self-tracking tracker to the HMD device based on the sensor data.

15. The tracking method according to claim 14, further comprising:
　　in response to the relative distance being smaller than a threshold distance, performing an upper body tracking of the user based on the second image.

16. The tracking method according to claim 14, further comprising:
　　in response to the relative distance being not smaller than a threshold distance, performing a full body tracking of the user based on the second image.

17. A self-tracking tracker, comprising:
　　a tracking sensor, configured to detect sensor data;
　　a camera, configured to obtain a user image;
　　a processor, configured to:
　　　　generate a self-tracking result based on the sensor data; and
　　　　generate a tracking result based on the user image and the self-tracking result; and
　　a network module, configured to provide the tracking result for updating an avatar of the user in a virtual world
　　wherein the self-tracking tracker is configured to detect whether the self-tracking tracker is placed stably on a plane or hanged on a wall based on the second image or the sensor data; and
　　in response to the self-tracking tracker not being placed stably, the second tracking result is not generated.

18. The self-tracking tracker according to claim 17, wherein the network module is configured to provide the tracking result to a server and the server is configured to update the avatar of the user in the virtual world.

19. The self-tracking tracker according to claim 17, wherein the network module is configured to provide the tracking result to an electronic device and the electronic device is configured to update and display the avatar of the user in the virtual world.

* * * * *